(12) United States Patent
Stepura et al.

(10) Patent No.: US 11,591,112 B2
(45) Date of Patent: Feb. 28, 2023

(54) DEVICE FOR CATCHING AND LAUNCHING AN UNMANNED AERIAL VEHICLE

(71) Applicants: Oleksandr Volodymyrovych Stepura, Kyivska oblast (UA); Mykola Mykolaiovych Toptun, Kyivska oblast (UA)

(72) Inventors: Oleksandr Volodymyrovych Stepura, Kyivska oblast (UA); Mykola Mykolaiovych Toptun, Kyivska oblast (UA); Volodymyr Zynoviiovych Stepura, Kyivska oblast (UA)

(73) Assignees: Oleksandr Volodymyrovych Stepura, Kyivska oblast (UA); Mykola Mykolaiovych Toptun, Kyivska oblast (UA)

( * ) Notice: Subject to any disclaimer, the term of this patent is extended or adjusted under 35 U.S.C. 154(b) by 0 days.

(21) Appl. No.: 17/651,503

(22) Filed: Feb. 17, 2022

(65) Prior Publication Data

US 2022/0258884 A1    Aug. 18, 2022

(30) Foreign Application Priority Data

Feb. 17, 2021  (UA) .............................. a 2021 00705

(51) Int. Cl.
| | |
|---|---|
| *B64F 1/06* | (2006.01) |
| *B64C 39/02* | (2023.01) |
| *B64F 1/02* | (2006.01) |

(52) U.S. Cl.
CPC .............. *B64F 1/06* (2013.01); *B64C 39/024* (2013.01); *B64F 1/029* (2020.01); *B64C 2201/021* (2013.01); *B64C 2201/084* (2013.01); *B64C 2201/182* (2013.01)

(58) Field of Classification Search
CPC .......... B64F 1/06; B64F 1/029; B64C 39/024; B64C 2201/021; B64C 2201/084; B64C 2201/182
See application file for complete search history.

(56) References Cited

U.S. PATENT DOCUMENTS 2,423,501 A * 7/1947 Johnson .................. B64C 25/26
                                                    244/102 SL
3,350,039 A * 10/1967 Crater ....................... B64F 1/06
                                                        188/71.6

(Continued)

FOREIGN PATENT DOCUMENTS

| EP | 2 046 644 B1 | 10/2011 |
| EP | 3 263 455 B1 | 1/2020 |
| WO | 2020/055374 A1 | 3/2020 |

*Primary Examiner* — Medhat Badawi
(74) *Attorney, Agent, or Firm* — Saliwanchik, Lloyd & Eisenschenk

(57) ABSTRACT

A device for catching and launching a guided UAV, the device comprises a supporting post, a horizontal shaft mounted on the post, and a lever is mounted on the horizontal shaft and can make a full revolution around a horizontal axis within a vertical plane, the lever is equipped with an engagement/disengagement device a means for interaction with the UAV catching device and an optical member, preferably arranged on the lever, for determining a location of the lever interaction means by an optical guidance system of the UAV. The lever comprises two coaxial portions, one is the engagement/disengagement device, and the second is a bar, wherein one end of the bar is coupled to the horizontal shaft, while another end thereof is connected to the engagement/disengagement device. The bar and the engagement/disengagement device are connected by a hinge that enables their fixation in a coaxial state and allows offset the axis of the engagement/disengagement device relative to the axis of the bar within a rotation plane of the lever. The horizontal (Continued)

shaft is equipped with a means for accumulating and/or dissipating the kinetic energy of the UAV, the lever is fixed on the shaft and can provide an elastic offset of the interaction means of the engagement/disengagement device within a plane perpendicular to the rotation plane of the lever, the interaction means configured to provide mutual locking/unlocking with the UAV catching device.

10 Claims, 18 Drawing Sheets

(56) References Cited

U.S. PATENT DOCUMENTS

| | | | | | |
|---|---|---|---|---|---|
| 3,367,608 | A * | 2/1968 | Charno | | B64F 1/02 244/110 R |
| 4,238,093 | A * | 12/1980 | Siegel | | B64F 1/06 244/63 |
| 4,311,290 | A * | 1/1982 | Koper | | B64F 1/0299 244/115 |
| 4,523,729 | A * | 6/1985 | Frick | | B64F 1/04 244/135 A |
| 4,678,143 | A * | 7/1987 | Griffin | | B64F 1/06 244/63 |
| 5,039,034 | A * | 8/1991 | Burgess | | B64F 1/125 114/261 |
| 5,109,788 | A * | 5/1992 | Heinzmann | | B63B 35/52 114/261 |
| 5,176,339 | A * | 1/1993 | Schmidt | | B64D 27/00 60/797 |
| 5,253,606 | A * | 10/1993 | Ortelli | | B63B 27/36 114/259 |
| 5,288,037 | A * | 2/1994 | Derrien | | E05B 47/0607 294/82.3 |
| 6,264,140 | B1 * | 7/2001 | McGeer | | B64F 1/0295 244/116 |
| 6,457,673 | B1 * | 10/2002 | Miller | | B64F 1/06 244/63 |
| 7,090,166 | B2 * | 8/2006 | Dennis | | B64F 1/06 244/63 |
| 7,114,680 | B2 * | 10/2006 | Dennis | | B64C 39/024 244/110 E |
| 7,121,507 | B2 * | 10/2006 | Dennis | | B64F 1/06 244/116 |
| 7,128,294 | B2 * | 10/2006 | Roeseler | | B64F 1/06 244/49 |
| 7,140,575 | B2 * | 11/2006 | McGeer | | B64F 1/04 244/63 |
| 7,143,974 | B2 * | 12/2006 | Roeseler | | B64C 39/024 244/63 |
| 7,152,827 | B2 * | 12/2006 | McGeer | | B64F 1/06 244/49 |
| 7,165,745 | B2 * | 1/2007 | McGeer | | B64F 1/06 244/114 R |
| 7,175,135 | B2 * | 2/2007 | Dennis | | B64C 25/68 244/110 F |
| 7,219,856 | B2 * | 5/2007 | Watts | | B64F 1/02 244/110 F |
| 7,259,357 | B2 * | 8/2007 | Walker | | B60T 8/4266 156/499 |
| 7,264,204 | B1 * | 9/2007 | Portmann | | B64C 39/024 244/110 F |
| 7,422,178 | B2 * | 9/2008 | DeLaune | | F16B 19/02 244/129.1 |
| 7,472,461 | B2 * | 1/2009 | Anstee | | A63B 29/02 24/600.8 |
| 7,578,467 | B2 * | 8/2009 | Goodrich | | B64F 1/029 73/862.392 |
| 7,686,247 | B1 * | 3/2010 | Monson | | B64F 1/0299 244/110 R |
| 7,748,661 | B2 * | 7/2010 | Harris | | B64C 1/12 244/137.4 |
| 7,798,445 | B2 * | 9/2010 | Heppe | | B64F 1/025 244/110 E |
| 7,806,366 | B2 * | 10/2010 | Jackson | | B64C 39/024 244/110 F |
| 8,028,952 | B2 * | 10/2011 | Urnes, Sr. | | B64C 39/024 244/116 |
| 8,136,766 | B2 * | 3/2012 | Dennis | | B64C 39/024 244/199.4 |
| 8,205,537 | B1 * | 6/2012 | Dupont | | F41H 13/0006 102/504 |
| 8,313,057 | B2 * | 11/2012 | Rednikov | | B64F 1/04 244/110 C |
| 8,820,698 | B2 * | 9/2014 | Balfour | | H02G 7/056 248/548 |
| 8,944,373 | B2 * | 2/2015 | Dickson | | B64F 1/029 244/110 C |
| 9,085,362 | B1 * | 7/2015 | Kilian | | B64F 1/027 |
| 9,340,301 | B2 * | 5/2016 | Dickson | | B64C 39/024 |
| 9,896,222 | B2 * | 2/2018 | Kunz | | B64C 39/024 |
| 10,183,741 | B2 * | 1/2019 | Roeseler | | B64C 27/001 |
| 10,293,929 | B2 * | 5/2019 | von Flotow | | B64D 5/00 |
| 10,513,350 | B1 * | 12/2019 | Kunz | | B64C 25/68 |
| 10,618,676 | B2 * | 4/2020 | Chen | | B64F 1/04 |
| 10,696,420 | B2 * | 6/2020 | von Flotow | | B65H 54/28 |
| 10,752,357 | B2 * | 8/2020 | von Flotow | | B64D 5/00 |
| 10,800,547 | B1 * | 10/2020 | McGann | | F16F 7/116 |
| 10,843,817 | B2 * | 11/2020 | Gilchrist, III | | B64F 1/0297 |
| 10,988,257 | B2 * | 4/2021 | von Flotow | | B64C 27/14 |
| 11,027,844 | B2 * | 6/2021 | von Flotow | | B64D 5/00 |
| 11,066,184 | B2 * | 7/2021 | Wyrobek | | B64F 1/0297 |
| 11,204,612 | B2 * | 12/2021 | von Flotow | | G05D 1/0858 |
| 11,235,892 | B2 * | 2/2022 | von Flotow | | B64F 1/0299 |
| 11,312,492 | B1 * | 4/2022 | von Flotow | | B64D 5/00 |
| 11,319,068 | B2 * | 5/2022 | McGeer | | B64C 39/024 |
| 11,370,538 | B2 * | 6/2022 | Stepura | | G05D 1/0661 |
| 2002/0100838 | A1 * | 8/2002 | McGeer | | B64C 39/024 244/116 |
| 2004/0232282 | A1 * | 11/2004 | Dennis | | B64F 1/04 244/110 E |
| 2006/0102783 | A1 * | 5/2006 | Dennis | | B64F 1/222 244/110 F |
| 2006/0249623 | A1 * | 11/2006 | Steele | | B64F 1/04 244/116 |
| 2007/0023582 | A1 * | 2/2007 | Steele | | B64C 39/024 244/190 |
| 2007/0051849 | A1 * | 3/2007 | Watts | | B64F 1/02 244/110 F |
| 2007/0158498 | A1 * | 7/2007 | Snediker | | B64F 1/0297 244/110 F |
| 2008/0156932 | A1 * | 7/2008 | McGeer | | B64F 1/04 244/110 F |
| 2009/0224097 | A1 * | 9/2009 | Kariv | | B64F 1/029 244/110 F |
| 2009/0294584 | A1 * | 12/2009 | Lovell | | B64C 39/024 901/30 |
| 2010/0237183 | A1 * | 9/2010 | Wilson | | B64C 39/024 244/3 |
| 2013/0082137 | A1 * | 4/2013 | Gundlach | | B64C 39/024 244/110 G |
| 2016/0096622 | A1 * | 4/2016 | Richardson | | B64C 39/024 701/2 |
| 2016/0114906 | A1 * | 4/2016 | McGeer | | B64C 39/024 244/114 R |
| 2016/0137311 | A1 * | 5/2016 | Peverill | | B64C 25/68 701/16 |
| 2016/0144980 | A1 * | 5/2016 | Kunz | | B64F 1/02 244/110 C |
| 2017/0101172 | A1 * | 4/2017 | Walke | | B64C 25/26 |
| 2017/0369185 | A1 * | 12/2017 | Grubb | | B64C 39/024 |
| 2018/0079530 | A1 * | 3/2018 | Wyrobek | | B64F 1/029 |
| 2020/0079505 | A1 * | 3/2020 | Stepura | | G08G 5/0069 |
| 2021/0269141 | A1 * | 9/2021 | Stepura | | B64C 1/26 |

* cited by examiner

DEVICE FOR CATCHING AND LAUNCHING AN UNMANNED AERIAL VEHICLE

CROSS-REFERENCE TO RELATED APPLICATION

This application claims priority to Ukrainian Application No. a 2021 00705, filed Feb. 17, 2021, which is hereby incorporated by reference in its entirety.

FIELD OF THE INVENTION

The claimed invention pertains to the field of providing an off-aerodrome servicing of unmanned aerial vehicles (hereinafter referred to as the UAVs) and relates to a device for catching and launching remotely or automatically piloted UAVs.

Use of small unmanned guided aerial vehicles, which are heavier than air and have a fixed wing, is widespread and necessary to conduct tasks, which are associated with surveillance, map-making, delivery of operational loads etc., within hard-to-reach or dangerous locations, where manned flights are inexpedient or impossible. One of the requirements for implementation of such use of the UAVs lies in a necessity of their timely catching followed by landing and launch within locations, which are not associated with stationary runways, for which various methods and devices are developed, which enable to perform these operations in a mobile fashion.

PRIOR ART

The prior art discloses devices for catching UAVs, which utilize a system of supports and ropes and which may be mounted, in particular, on a vessel's deck, as disclosed, e.g., in the U.S. Pat. No. 9,896,222 B2 dated Feb. 20, 2018 and pat. EP3263455 B1 dated Jan. 29, 2020. Said devices act to point a cantilever of the UAV wing having an arrow-like shape onto a flexible member that is extended on the supports and, upon engagement with a front edge of the UAV wing, slides along the same as along a guide and enters a locking grip that fixes the flexible member. Therewith, the flexible member is connected to an energy absorption means being a so-called arresting device that dissipates the energy transferred by the aerial vehicle thereto.

A drawback of said solutions lies in a lack of landing controllability, since upon fixation in the locking grip, the UAV hangs on the flexible member, afterwards it is taken down for landing and removed, which requires use of additional means and personnel involvement.

Said drawback was eliminated in pat. U.S. Ser. No. 10/843,817 B2 dated Nov. 24, 2020, wherein a catching member is made as an elongated member that is pivotally fixed, with one end, in a base portion, and has a means for intercepting the UAV during the flight on another end. Therewith, the catching member is arranged on the base portion in a pivotable fashion between an angular and a vertical orientation relative to the base portion, and it is configured to be bent during catching of the UAV and aligned along its longitudinal axis after disconnection that occurs upon reaching by the UAV, due to bending of the catching member, a bearing surface that could be a ground or a platform, which the base portion of the device is mounted on. The device further comprises an energy absorption and dissipation means that, in combination with the flexibility of the catching member, facilitates an effective dampening of landing loads from the UAV. Said solution enables to catch and control the landing, however, it does not enable to use the same for launching the UAV that requires a separate means, thereby limiting its functionality.

This problem is solved by creating double-purpose devices, which are configured both to take-off and to catch the UAV during the landing and which are successful in the most cases, however there is a continuous need in increasing their efficiency.

For example, pat. EP2046644 B1 dated Oct. 5, 2011 discloses a system for catching and launching unmanned aerial vehicles, the system having a structure that comprises a base support with a vertical post mounted thereon, wherein a lever is mounted on the post by means of axis means in such a way that the lever has two arms formed therein, wherein a longer arm is configured to be equipped with a Y-shaped catching means having a slingshot-type elastic means stretched between its ends, or a launching means, configured to have the UAV mounted thereon, while a shorter end of the lever has a counterweight fixed thereon, the counterweight holds the end of the longer arm in a position higher than the axial fixation means. Also, the shorter end of the lever is connected to the base support by means of a controllable pulling and braking means that consists of a winding machine and a rope. The system also comprises a homing means serving for piloting the UAV.

A method for catching the UAV comprises determining a spatial location of the UAV and bringing the lever to a position of interception with a movement trajectory of the UAV, wherein the UAV is equipped with a hook-type means on a lower surface of a body for connection to the elastic means of the Y-shaped catcher. When the hook catches the elastic means, it will be fixed thereon and bring the lever into rotational movement around the axial fixation means. A portion of the kinetic energy of the UAV is absorbed during its interaction with the elastic catching means, while the movement of the lever is dampened by means of the pulling braking means until the end of its longer arm is stopped over plane of the base support.

For launching, the end of the longer arm of the lever is re-equipped with a carriage-type means, on which the UAV is mounted, while the pulling braking means is controlled into a position, where it pulls the end of the shorter arm of the lever and brings the upper end of the lever into a position that is opposite to the position of catching of the UAV, afterwards, it releases the same according to an ejector principle and provides the UAV with an acceleration during the release from the carriage being sufficient for the take-off.

The main drawback of this system lies in that it requires reconfiguring and bringing its components into various positions and operational modes in order to perform catching and take-off. Besides, making the long end of the lever longer than the vertical support provides a small trajectory both for the braking and for the speeding-up, thereby posing a risk of damaging the UAV after catching due to bumping into the base support or surface, which it is mounted on, in case of inaccurate calculations of the braking forces of the winding means, also, there is a risk of damaging and failure of the lever itself due to overloads caused by dynamic forces, thereby reducing the usage reliability of this system.

In the application WO2020055374A1 dated Mar. 19, 2020, this drawback was eliminated by creating a structure, wherein a catching lever is arranged on a supporting structure and fixed on a shaft with a possibility of making a full revolution around its horizontal axis in a vertical plane. Therewith, a height from a location of fixation of the lever on the shaft to a surface, which the supporting structure is mounted on, exceeds the overall length of the lever with consideration of a dimension of the UAV, while a distance from the supporting structure to a rotation plane of the lever is selected with consideration of a possible horizontal offset of the UAV during take-off or landing. The end of the lever has a UAV interaction means mounted thereon, which is equipped with an engagement/disengagement device in the form of a hook with a catching member that is arranged on the UAV, while the lever itself is made monolithic and of a lightweight and rather flexible material. The structure is equipped with a positioning means in order to enable an interaction between the lever end and the UAV. In order to dissipate the kinetic energy from the UAV during its catching and in order to facilitate its launching to provide an initial acceleration, a shaft that is driven by a motor is used. Upon catching, the lever with the UAV performs at least one revolution around the horizontal shaft until the lever with the hooked UAV is stopped in the lowermost point. The launch occurs from said lowermost point by driving the shaft by means of the controllable motor with a simultaneous switch on of the UAV motor and their disengagement, when the lever end with the UAV coupled thereto has achieved a take-off point, i.e. a certain runaway speed above the horizontal plane.

A drawback of said solution lies in that the lever is made monolithic, thereby exposing the same to a fracture force that occurs on the lever end at the moment of engagement/disengagement of the UAV when subjected to a braking/runaway moments. Therewith, although the flexibility of the lever material results in an additional dampening of buff loads caused by encounter with an inertial mass of the UAV during its engagement with the lever during catching, it has a negative effect on alignment of the UAV flight trajectory during disengagement during the launching under the influence of said inertial forces.

SUMMARY OF THE INVENTION

A task of the claimed invention is to improve a device for catching and launching the UAV, wherein the prior art drawbacks are considered and resolved to the fullest extent, in order to enable performing an unlimited number of cycles of catching the UAV and its further launching, or its launching and further catching from the same device, at the same tie reducing a probability of damaging said device and/or the UAV by influence of mechanical oscillations, which occur at the moment of catching, during the process of braking until the full stoppage, speed-up and start until the UAV gets off and under the action of forces from external environmental impacts onto a system of device-caught UAV, and providing accumulation and use of a portion of a kinetic energy from catching of the UAV for launching the same.

The posed task is resolved by the fact that the device for catching and lunching the guided unmanned aerial vehicle comprises a supporting post with a horizontal shaft mounted in an upper portion thereof, and a lever is mounted on the shaft with a possibility of making a full revolution around a horizontal axis within a vertical plane, the lever comprises an engagement/disengagement device that is equipped with an interaction means for interaction with an UAV catching device and an active or a passive optical member, which is preferably arranged on the lever, for determining a location of the lever interaction means by an optical guidance system of the UAV. According to the invention, the lever consists of two coaxial portions, one of which is the engagement/disengagement device, and the second one is a bar. One end of the bar is coupled to the horizontal shaft, while another end thereof is connected to the engagement/disengagement device. Therewith, the engagement/disengagement device and the bar are connected by means of a hinge that is configured to fix them in a coaxial state and to offset the axis of the engagement/disengagement device relative to the axis of the bar within a rotation plane of the lever. The horizontal shaft is equipped with a means for accumulating and/or dissipating the kinetic energy of the UAV, and the lever is fixed on the shaft with a possibility of providing an elastic offset of the interaction means of the engagement/disengagement device within a plane that is perpendicular to the rotation plane of the lever. Therewith, the interaction means is configured to provide a mutual locking/unlocking with the catching device of the UAV.

Said arrangement of the device enables to implement possibilities of catching and launching of the UAV with effective reduction of buff and vibrational loads acting onto its components and forming a movement trajectory of the UAV, thereby providing stabilization and operational improvement of the device in the catching and stoppage process, as well as during speeding-up for take-off, and provides its reliable operation.

In separate embodiments, the hinge connection may be made as a hinge with a counterspring that is made either cylindrical or spiral, or as a hinge having an elastic rope, or as a hinge having a cylindrical spring and a cam fixing device, or as a hinge that is equipped with a servomotor, and provide performance of its functions of connecting the lever portions, their elastic offset one relative to another under the action of external forces towards the lever rotation and fixing the lever portions one relative to another, when there are no loads.

The hinge enables the lever to take a geometrical shape depending on forces acting thereon. To this end, the hinge connection is made constrained in terms of a degree of movement freedom within the plane that is perpendicular to the rotation plane of the lever, with provision of movement of the engagement/disengagement device upon subjecting the same to a force within the rotation plane of the lever only, and equipped with a mechanism for returning the engagement/disengagement device into the coaxial position with another portion after the subjected force is released. Therewith, the portion of the lever being the engagement/disengagement device, shorter or having the same length as the bar, minimizes the influence of a fracture moment onto the lever end, thereby reducing the probability of damaging the UAV and its collision with the device members in case sudden wind onsets occur.

As the means for accumulating and/or dissipating the kinetic energy, in separate exemplary embodiments, a mechanical system may be used, the system consisting of a counterweight that is fixed on the shaft and has a mechanical and/or electromechanical brake or a programmable servomotor, and enables to damp the kinetic energy of the UAV during capturing and to transmit a portion of the required energy in the process of speeding-up at the starting step.

The elastic offset of the interaction means of the engagement/disengagement device within the plane that is perpendicular to the rotation plane of the lever may be implemented, e.g., as making the bar with a planar elastic section, and enables to significantly reduce buff loads onto the device and swinging of the UAV in case the hook contacts the working portion of a frame followed by sliding of the hook to an optimal engagement point that is located in the middle of the working portion of the frame on a single vertical line with a mass center of the hooked UAV.

A possibility of the mutual locking/unlocking of the interaction means for interaction with the engagement device of the UAV that may be made by means of mechanical or electromechanical means mounted in the engagement/disengagement device being the portion of the lever enables to solve the task of both decoupling of the UAV at the required moment of the take-off and a reliable catching during the engagement, and enables to perform two tasks with a single means without reconfiguring. Therewith, the interaction means may be made as a hook, and the catching device of the UAV—as an elastic frame, or vice versa.

According to separate exemplary embodiments, the supporting post may be made with two supports having the shaft arranged therebetween or as a single support with the shaft fixed in a cantilever fashion, and the possibility of altering the position of the post relative to the vertical axis may be provided by means of its rearrangement or by means of rotation due to the provided possibility of arranging the post on the platform that rotates to enable its orienting in correspondence with the movement direction of the UAV and with consideration of continuous airflows.

DESCRIPTION OF THE DRAWINGS

The claimed invention is illustrated in the following drawings:

Figure 1:
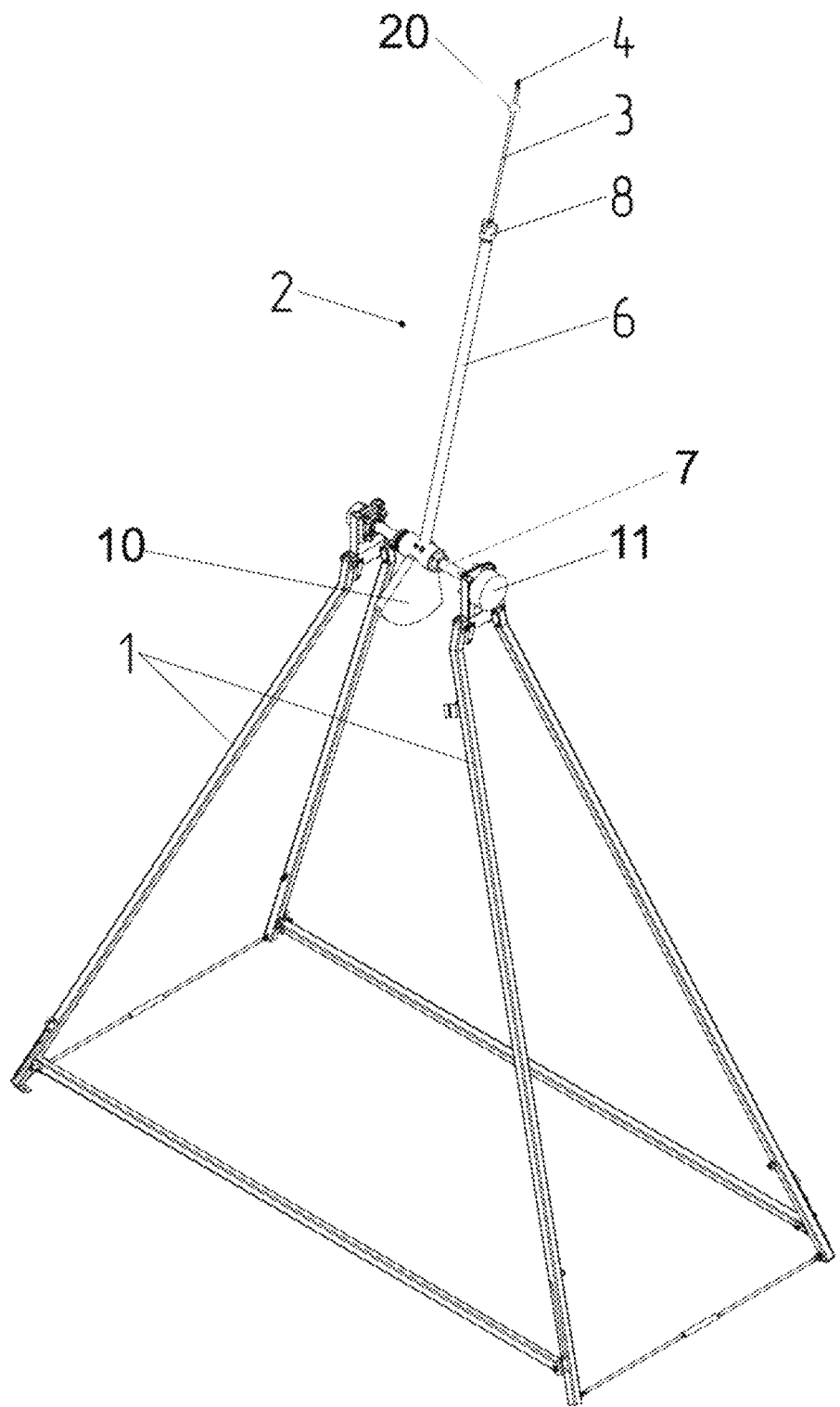
FIG. 1 is a general view of the device for catching and launching the UAV with the supporting post in the form of two supports and with the mechanical means for accumulating and dissipating the kinetic energy of the caught UAV.

Elements of the drawing figures are designated with identical positions and are as follows:
1. supporting post;
2. lever;
3. engagement/disengagement device;
4. hook;
5. elastic frame;
6. bar;
7. shaft;
8. hinge;
9. rotatable platform;
10. counterweights;
11. brakes;
12. servomotor;
13. planar elastic insert of the bar;
14. cylindrical spring of the hinge;
15. spiral spring of the hinge;
16. elastic rope of the hinge;
17. cam fixing device of the hinge;
18. spring of the cam fixing device;
19. UAV;
20. optical member.

The provided drawings, which are included into the present description of the invention and constitute its part, illustrate embodiments of the invention and serve to explain the invention principles along with the description.

DETAILED DESCRIPTION OF THE EMBODIMENT OF THE INVENTION

An illustrative embodiment of the invention is described hereinafter in detail using said figures. Implementations, which are disclosed in the following description of the embodiment, do not encompass all implementations of the invention, rather they serve solely to provide an additional explanation of the essence thereof.

The claimed device comprises the supporting post (1) with the horizontal shaft (7) arranged in the vertical portion thereof, and the lever (2) is arranged with a possibility of making a full revolution around the horizontal axis of the shaft (7) within the vertical plane.

The supporting post (1) is a bearing structure, which all other members of the device are mounted on and which may be made using known technologies and a wide range of structural materials such as metal, plastic or composite profiles. A number of embodiments of the post (1) is not limited under the proviso of performing its main function. The inventors have manufactured and tested the embodiments of the supporting post (1) with two side supports and with the shaft fixed therebetween as illustrated in FIG. 1, FIG. 2, FIGS. 17 and 18, as well as in the form of the single support with the shaft fixed in the cantilever fashion as illustrated in FIG. 3, FIG. 4, FIG. 5, FIG. 14, FIG. 15 and FIG. 16.

Figure 14:
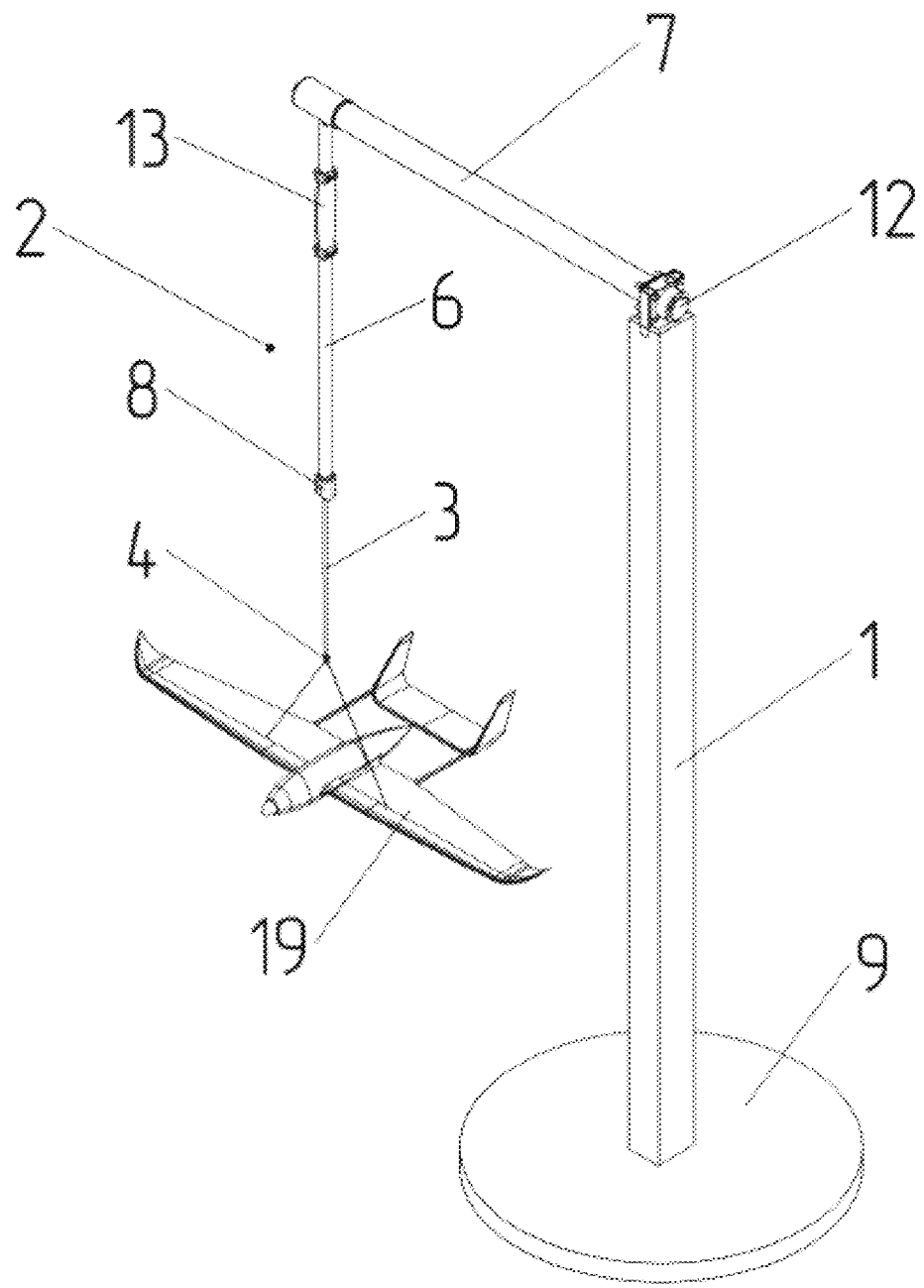
FIG. 14 is an initial position during the launch of the UAV.
Figure 15:
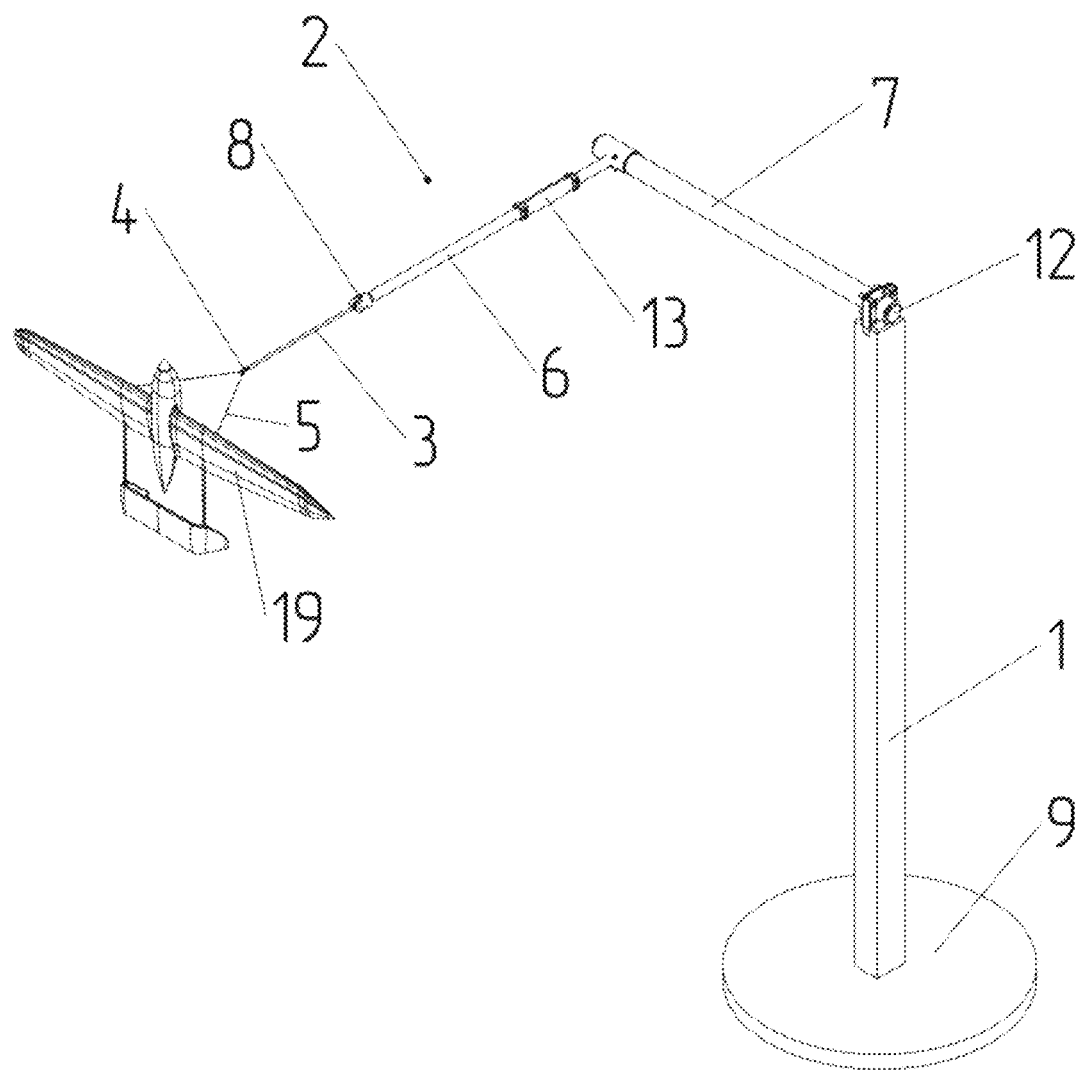
FIG. 15 is a speed-up during the launch of the UAV.
Figure 16:
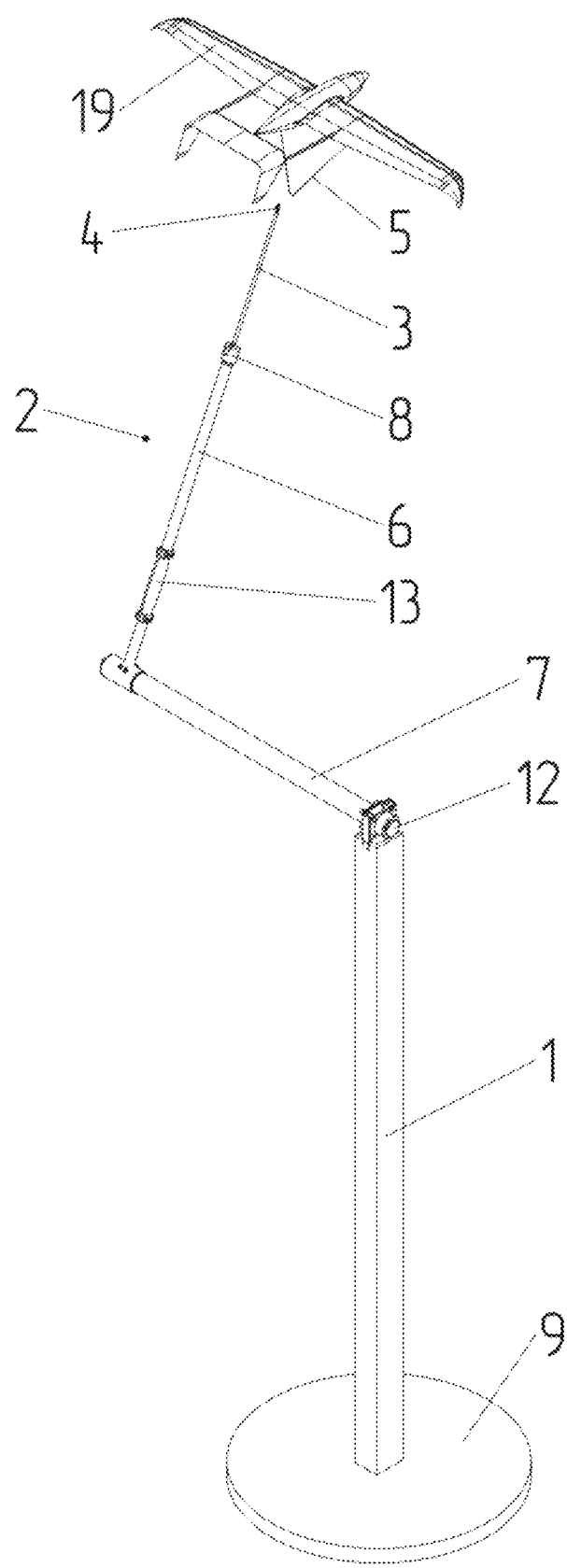
FIG. 16 is a disengagement of the UAV during the launch of the UAV.
Figure 17:
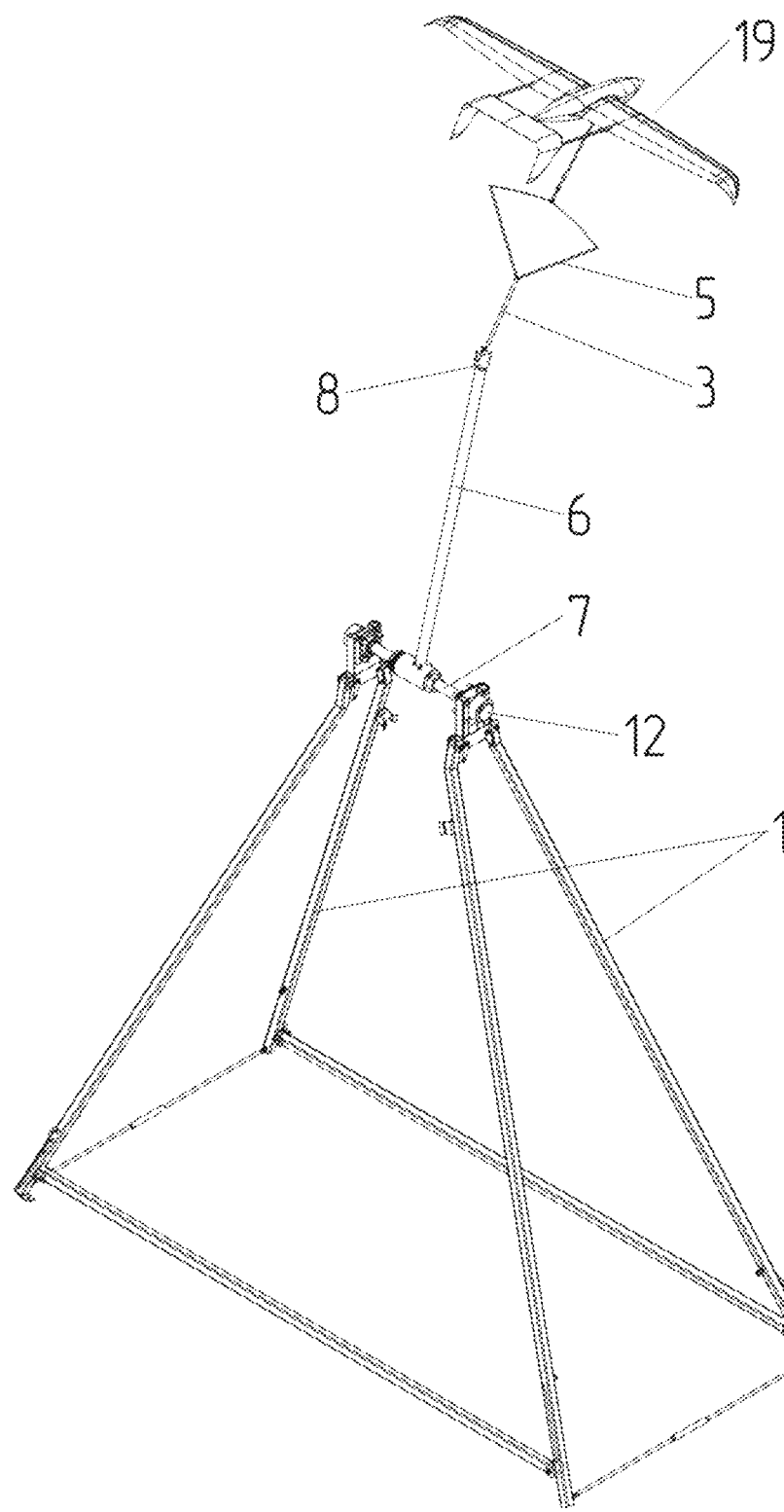
FIG. 17 is a catching of the UAV by the device for catching and launching the UAV with the means of interaction with the catching device of the UAV in the form of the elastic frame at the moment of catching.
Figure 18:
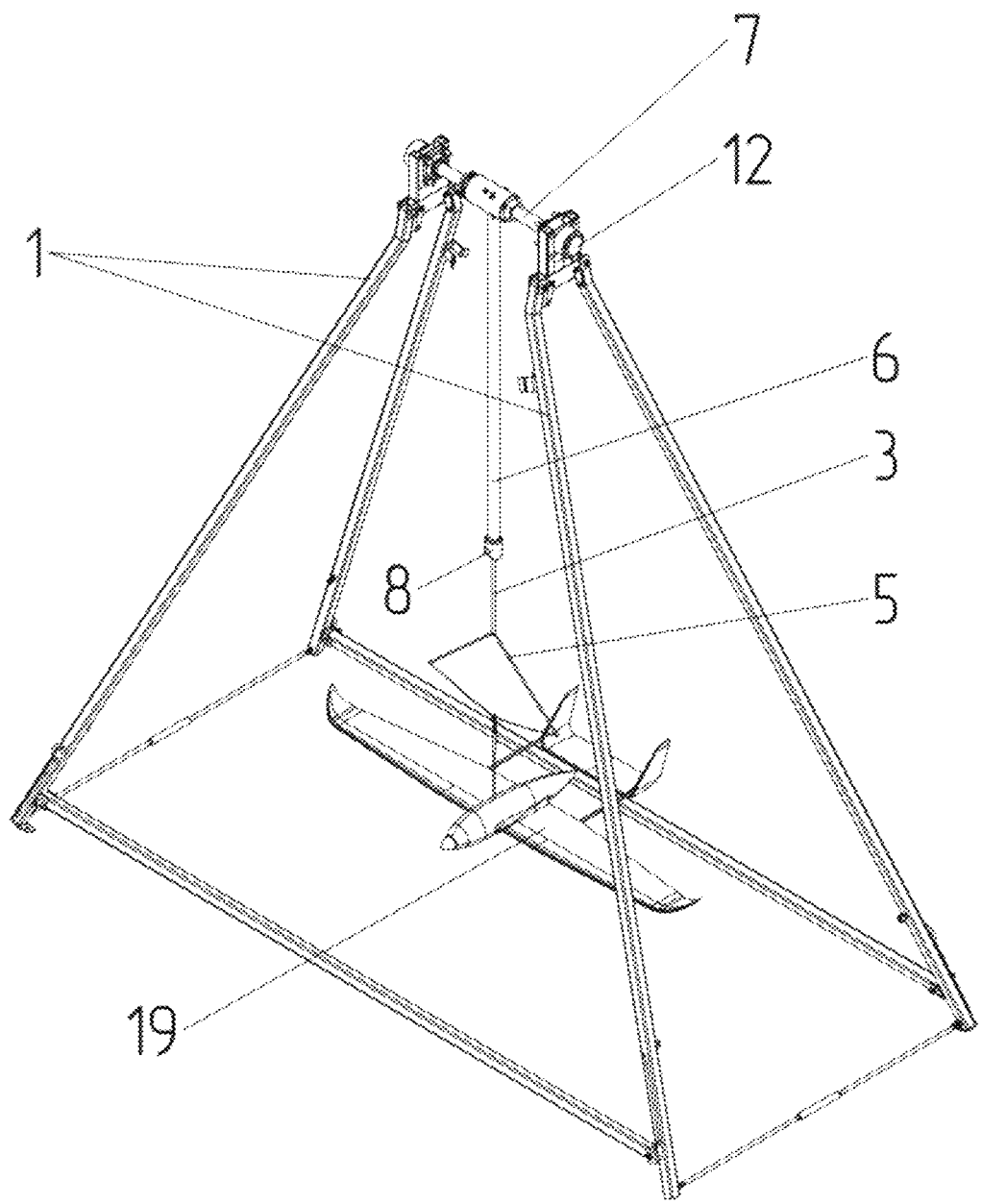
FIG. 18 is the device of FIG. 17 at the moment of completion of the catching.

The rotation of the post (1) around the vertical axis may be performed manually, by rearrangement as, e.g., in the embodiment illustrated in FIG. 1, FIG. 2, FIG. 17 and FIG. 18, and by automatic rotation by arranging the post (1) on the rotatable platform (9) as illustrated in FIG. 14, FIG. 15, FIG. 16 that is equipped with a drive and, e.g., with a remote control means. Provision of the rotation possibility is required to orient the device relative to a wind direction that is taken into account, when the UAV approaches prior to be caught, and to orient the device in the process of launching the UAV, to provide movement of the UAV at these moments against the wind, and enables to made the device portable and usable in conditions of open spaces and limited areas such as a vessel's deck, a platform of a terrain vehicle etc.

All the constituent components of the lever 2 may be manufactured using metal and/or plastic profiles. The rotation of the lever 2 around the horizontal axis is provided by means of its fixation on the shaft that is arranged on the supporting post on bearings.

One of the constituent components of the lever is the engagement/disengagement device (3) that is equipped with the means (4) for interaction with the catching device (5) of the UAV (19). The engagement/disengagement device (3) is equipped with interaction means of the catching devices, which are known in the art, including such a member as a hook or an elastic frame. Also, preferably, the active or passive optical member (20) for determining a location of the interaction means (4) of the lever (2) by the optical guidance system of the UAV is arranged on the lever (2).

In order to provide an accurate guidance of the UAV and, thus, an accurate contact of the catching device and the corresponding interaction means of the UAV, the passive optical member 20 is arranged on the lever 2, the optical member may reflect the optical emission that comes from the UAV or the active optical member in the form of an optical emission source. Said UAV guidance methods are known from the prior art and a skilled person will appreciate that in order to provide the optical contact between the device and the UAV, a pattern recognition technology within a visible or an infrared specter may be used.

The lever (2) consists of two coaxial portions, one of them is the engagement/disengagement device (3), while another one is the bar (6) with its one end being coupled to the shaft (7), and with another end being connected to the engagement/disengagement device (3), wherein they are connected one relative to another one by means of the hinge (8) with a possibility of fixation in the coaxial state and offset of the axis of the engagement/disengagement device (3) relative to the axis of the bar (6) within the rotation plane of the lever (2) of the UAV, which are heavier than air with a fixed wing, have a very low load per unit of area of the wing and, therefore, side wind onsets of even small and average forces lead to oscillations of the entire device-UAV system within the period from the moment of contact until stoppage or from the moment of start until the UAV gets off. In the course of many researches and tests of operation of the device with the lever that was the bar rigidly connected to the engagement/disengagement device, it has been established that depending on external airflows and the UAV velocity at the moment of the contact of the device with the UAV, oscillations of the lever and the UAV fixed thereto, which rather often coincided with resonance frequencies of the system lever-with-the-caught-UAV that has been confirmed upon analysis of an accelerated video shooting. Occurrence of the oscillations increases the probability of damaging the UAV and the device in the period between catching until the full stoppage of the UAV.

A method for avoiding resonance that is known from the prior art lies in increasing the rigidity of the lever, however, in the course of tests, it has been unexpectedly found that if two portions of the lever, namely the bar and the engagement/disengagement device, are enabled to perform a revolution within the rotation plane of the lever independently from each other within a certain period of time from the moment of catching, then a critical level of the oscillations will be reduced significantly. The connection between the bar and the engagement/disengagement device by means of the hinge has allowed to provide the offset of the axis of the engagement/disengagement device relative to the axis of the bar only within the rotation plane of the lever and has enabled to form such a movement trajectory of the caught UAV from the moment of catching until the stoppage that provides reduction the dependency on a set of such factors as the UAV velocity and possible external environmental impacts, which may act in various directions. This may be explained by the fact that the offset of the UAV movement from the circular trajectory alters a nature of forces, which act on the lever, and the presence of the hinge alters the resonance frequencies of the lever as compared to the embodiment, wherein the bar and the engagement/disengagement device are made integral or are rigidly connected between each other, which, in combination, consequently reduces the level of undesired mechanical oscillations of the lever and the UAV.

Use of the hinge with the elastic member enables to hold the bar and the engagement/disengagement device on the single axis in the state of waiting for the catching or launch. Both the hinge and the elastic members may be manufactured of known materials, in particular, metal and plastic, and using technologies, which are known to persons skilled in the art. One of separate embodiments may utilize the hinge that is equipped with the servomotor that may create a rotary moment in various directions of rotation of the engagement/disengagement device relative to the bar and, therefore, act as a programmable elastic member.

Figure 2:
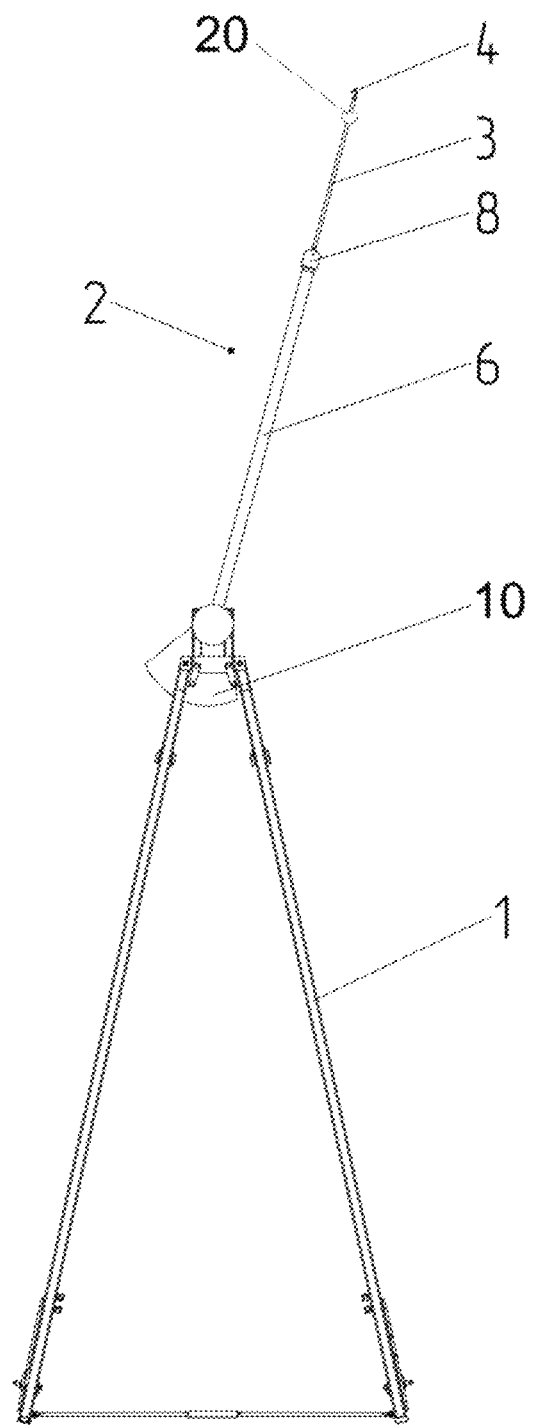
FIG. 2 is a side view of the device for catching and launching the UAV of FIG. 1.
Figure 3:
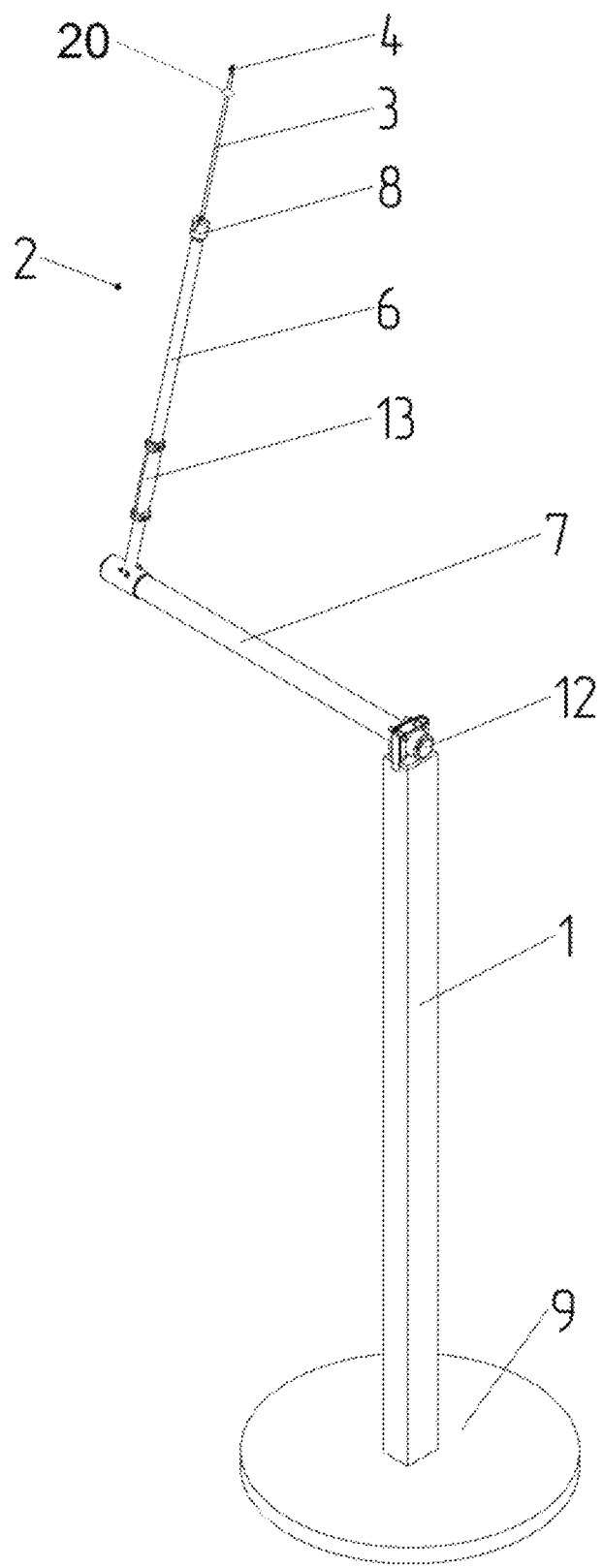
FIG. 3 is a general view of the device for catching and launching the UAV with the shaft fixed in a cantilever fashion and the supporting post arranged on the platform, with the electromechanical means for accumulating and dissipating the kinetic energy of the caught UAV and the bar with the planar elastic insert.
Figure 4:
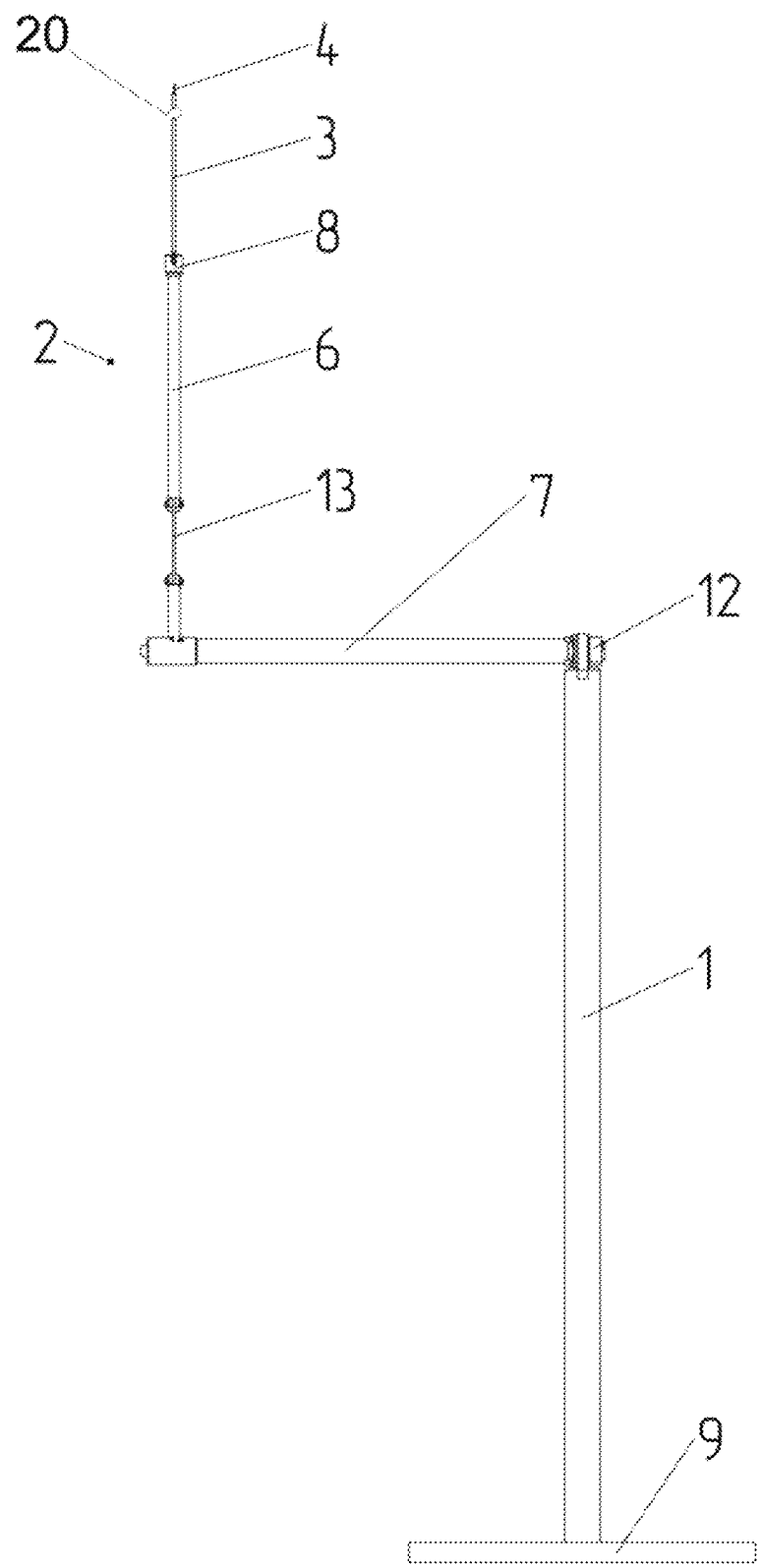
FIG. 4 is a front view of the device for catching and launching the UAV of FIG. 3.
Figure 5:
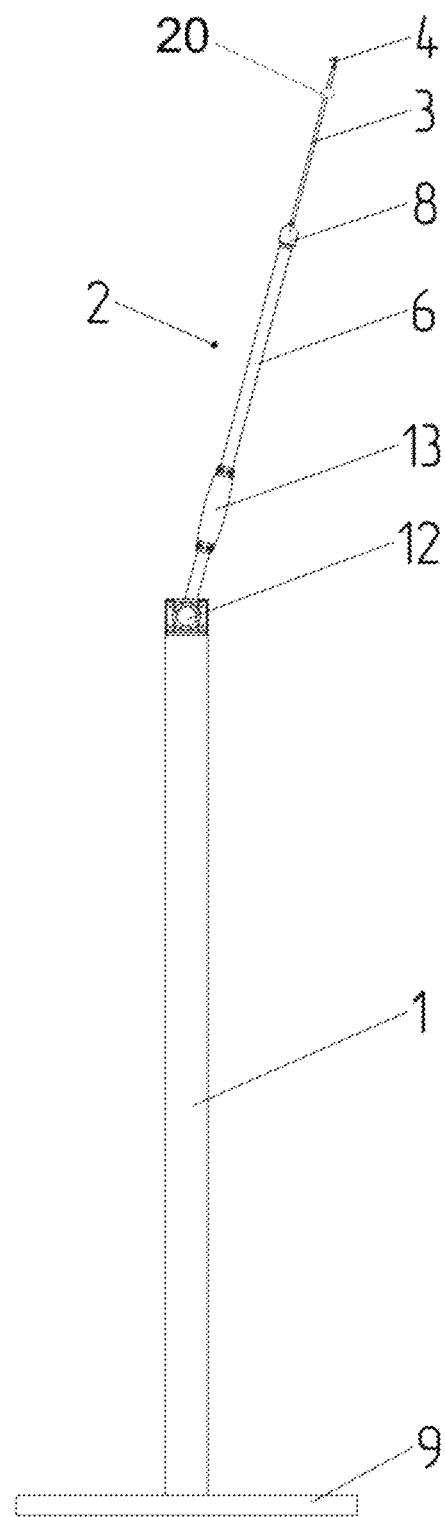
FIG. 5 is a side view of the device for catching and launching the UAV of FIG. 3.

In the inventive device, a portion of the kinetic energy of the caught UAV is dissipated, while another portion is accumulated in the shaft (7) due to equipping the shaft with the means (10, 11, 12) for accumulating and/or dissipating the kinetic energy of the UAV (19). According to one of separate exemplary embodiments, which are illustrated in FIG. 1, FIG. 2, FIG. 17 and FIG. 18, the kinetic energy of the UAV is accumulated by lifting the counterweight to an upper position relative to the shaft in the process of movement of the UAV from up to down. A portion of the kinetic energy may be dissipated by a braking device that is arranged on the shaft, while devices, which are known from the prior art, e.g., disc-type or drum-type brakes, may be used as the braking device. The embodiment with the counterweight that is illustrated in FIG. 1 and FIG. 2 has been manufactured by the inventors and used to conduct the research aimed at studying a deformation nature and forces, which act on the device members in the process of catching and launch.

Another exemplary embodiment is the embodiment that is illustrated in FIG. 3, FIG. 4, FIG. 5, FIG. 14, FIG. 15 and FIG. 16, wherein the device for accumulating and dissipating the energy of the UAV is made using the servomotor 12 being an electric motor with a reducing unit, a power supply unit and a control unit. Such devices are known from the prior art and enable to program rotation moments and rotation velocities depending on the external load. From the moment of catching the UAV, the servomotor operates in a recuperation mode and, thus, it is capable of creating the rotary moment in order to compensate for the rotary moment that occurs from the moment of catching the UAV and beginning of rotation of the lever.

According to the invention, the lever (2) is fixed on the shaft (7) with a possibility of elastic offset of the interaction means (4) of the engagement/disengagement device (3) within the plane that is perpendicular to the rotation plane of the lever (2).

At the moment of contact between the engagement/disengagement device and the means for catching the UAV, the engagement of the hook with the frame may occur at any point of the contact portion of the frame (contact point), afterwards, the hook immediately begins to slide along the elastic frame to the point of catching the frame that is located on the working portion of the frame in such a way that in case the UAV is hooked in this point, the point will appear on the vertical formal line drawn through the mass center of the UAV. The movement of the hook from the contact point to the catching point leads to transfer of the lever within the plane that is perpendicular to the vertical plane, wherein the UAV flight trajectory is build. In order to provide a safe catching of the portion of the lever, the bar and the engagement/disengagement device must be sufficiently rigid within the rotation plane of the lever to avoid undesired oscillations. Action of the forces, which lead to sliding of the hook along the elastic frame at the moment of catching, will occur within the plane that is perpendicular to the rotation plane of the lever. In order to provide such sliding of the hook along the frame, the rigidity of the lever must provide the offset of the catching point within the plane that is perpendicular to the rotation plane of the lever. In order to impart such properties to the lever, when its rigidity within the perpendicular planes must be different, technologies, which are known from the prior art, may be used. The lever or at least one of its portions may be made as an elongated body having a rectangular cross-section, wherein the longer side of the rectangular cross-section must be located within the rotation plane of the lever. In order to impart characteristics to the lever, when it has different rigidity within two mutually perpendicular planes, different embodiments of the bar and the engagement/disengagement device have been studied. The lever, wherein the bar and the engagement/disengagement device have different cross-sections, e.g., the bar is made with the planar elastic inserts and/or the engagement device is made with the planar elastic inserts, has been tested. In the course of testing of said embodiments, it has been established that they provide the achievement of the technical effect. The drawings depict the embodiment, wherein a portion of the bar has the planar elastic insert 13 that enables the lever to transfer the hook along the frame from the contact point to the catching point without creating undesired buff loads and oscillations of the entire device-UAV system.

According to the invention, the interaction means (4) is configured to provide a mutual locking/unlocking with the catching device (5) of the UAV.

The hook and the frame have been used as the interaction means as mentioned above. The device may be equipped with the hook or with the frame depending on a type of the catching means, which the UAV is equipped with. In order to enable conduction of an unlimited number of launching-catching cycles, the engagement/disengagement device must be equipped with the means for locking after catching the UAV and unlocking at the step of launching at the moment of getting off. The prior art discloses various mechanical and electromechanical locking/unlocking means, which may be used in the present invention. In order to conduct the tests, the inventors have used the electromagnetic locking/unlocking means.

Exemplary Embodiments of the Device

The mentioned particular embodiment of the device is in no way intended to limit the scope of claims appended hereto, rather to explain the essence of the invention.

Figure 6:
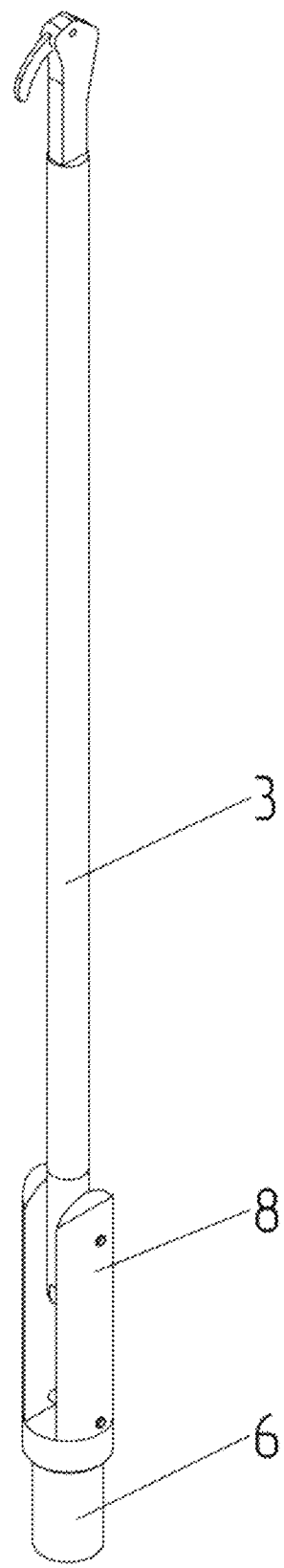
FIG. 6 is a general view of the engagement/disengagement device (3) with the hinge (8) that is configured to be fixed in the coaxial state and to offset the axis of the engagement/disengagement device (3) relative to the axis of the bar (6) within the rotation plane of the lever (2) using an elastic rope for the elastic offset.
Figure 7:
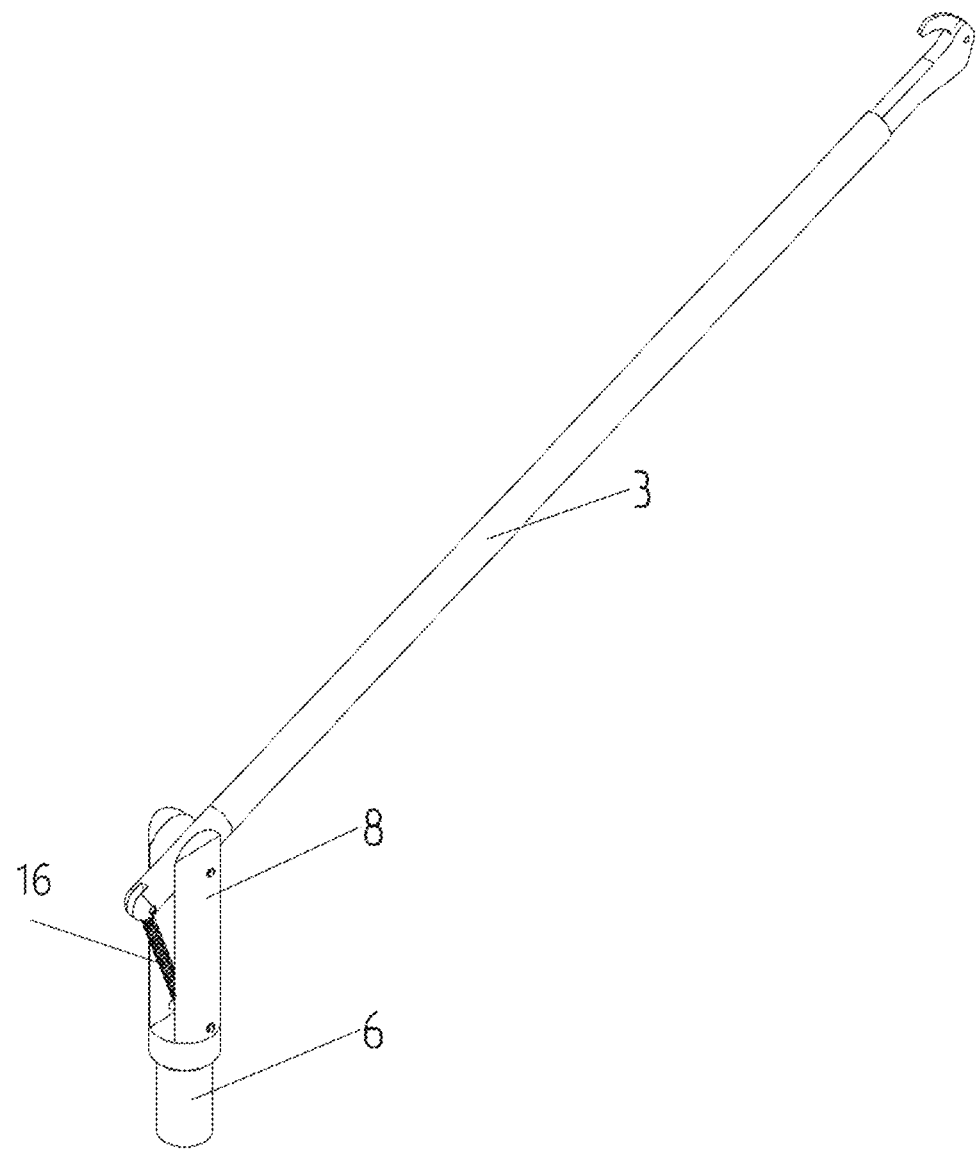
FIG. 7 is the device of FIG. 6 with the axis of the engagement/disengagement device being offset relative to the axis of the bar.
Figure 8:
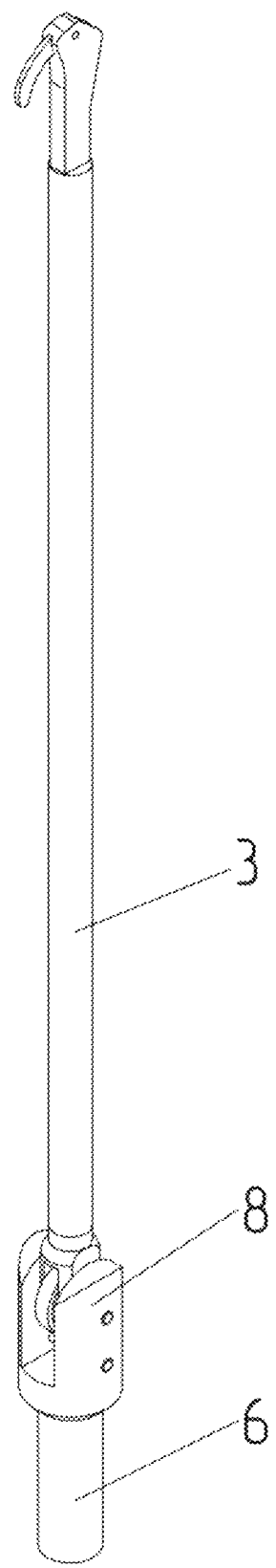
FIG. 8 is a general view of the engagement/disengagement device (3) with the hinge (8) that is configured to be fixed in the coaxial state and to offset the axis of the engagement/disengagement device (3) relative to the axis of the bar (6) within the rotation plane of the lever (2) using a spiral spring for the elastic offset.
Figure 9:
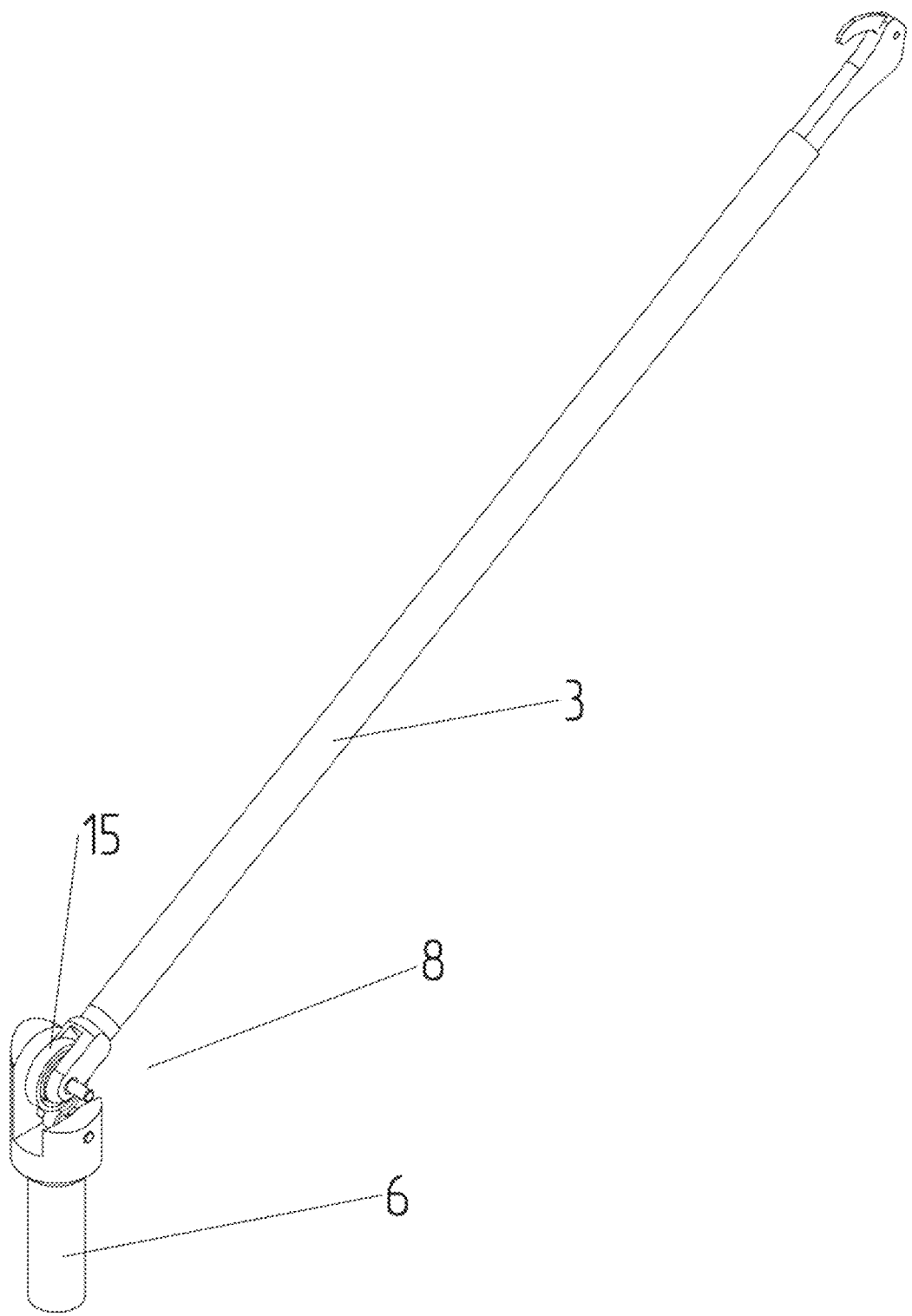
FIG. 9 is the device of FIG. 8 with the axis of the engagement/disengagement device being offset relative to the axis of the bar.
Figure 10:
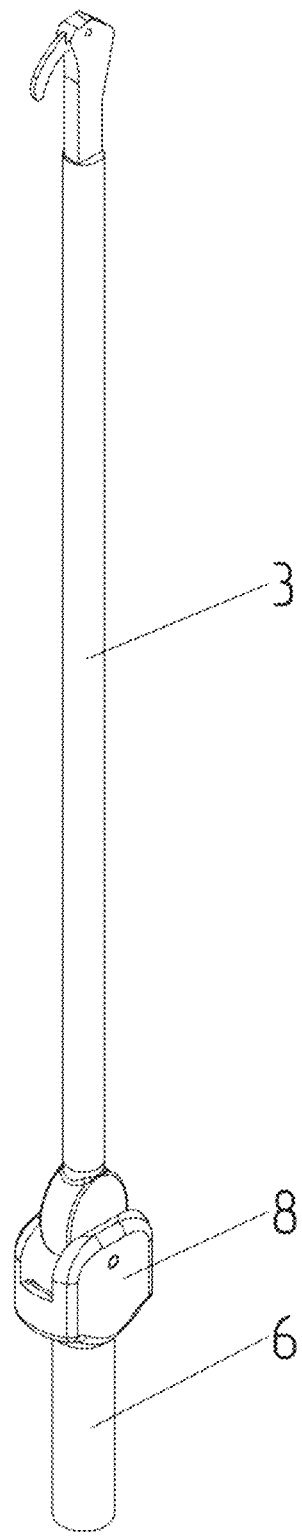
FIG. 10 is a general view of the engagement/disengagement device (3) with the hinge (8) that is configured to be fixed in the coaxial state and to offset the axis of the engagement/disengagement device (3) relative to the axis of the bar (6) within the rotation plane of the lever (2) using a cam and a cylindrical spring for the elastic offset.
Figure 11:
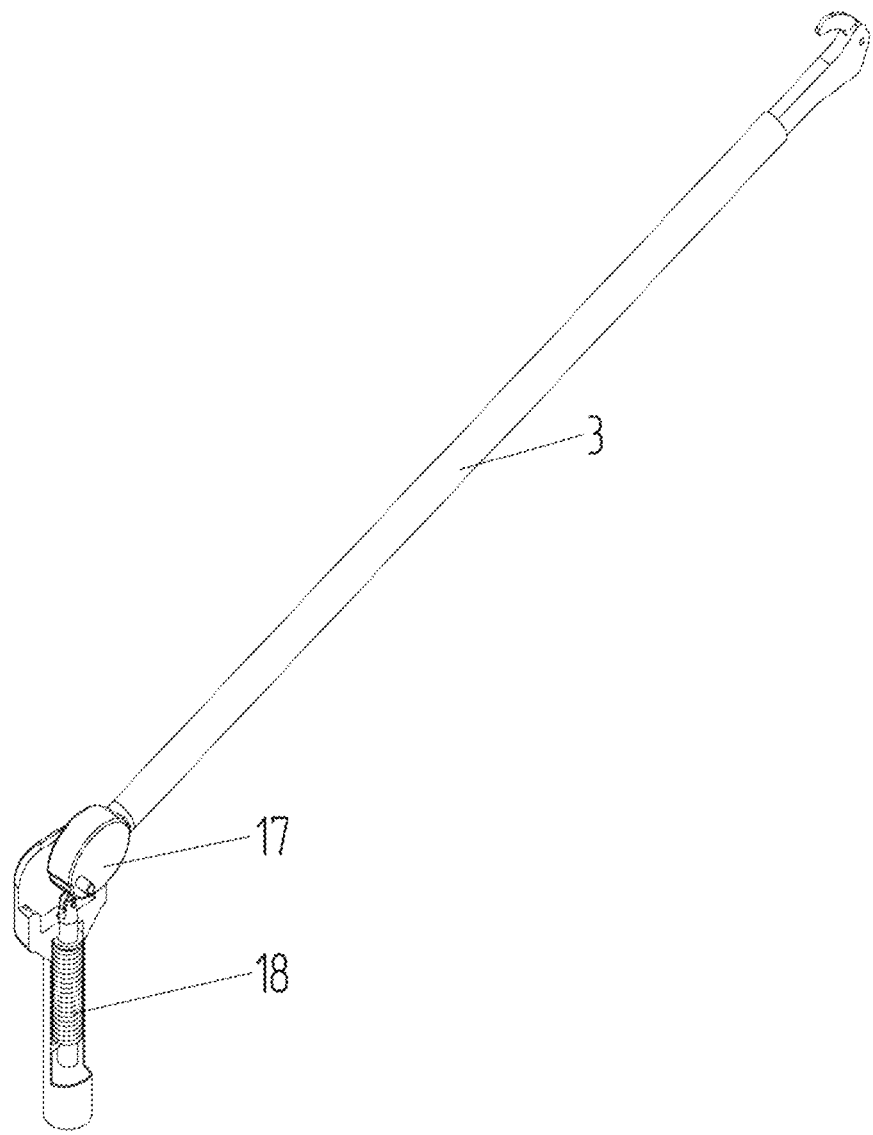
FIG. 11 is the device of FIG. 10 with the axis of the engagement/disengagement device being offset relative to the axis of the bar.
Figure 12:
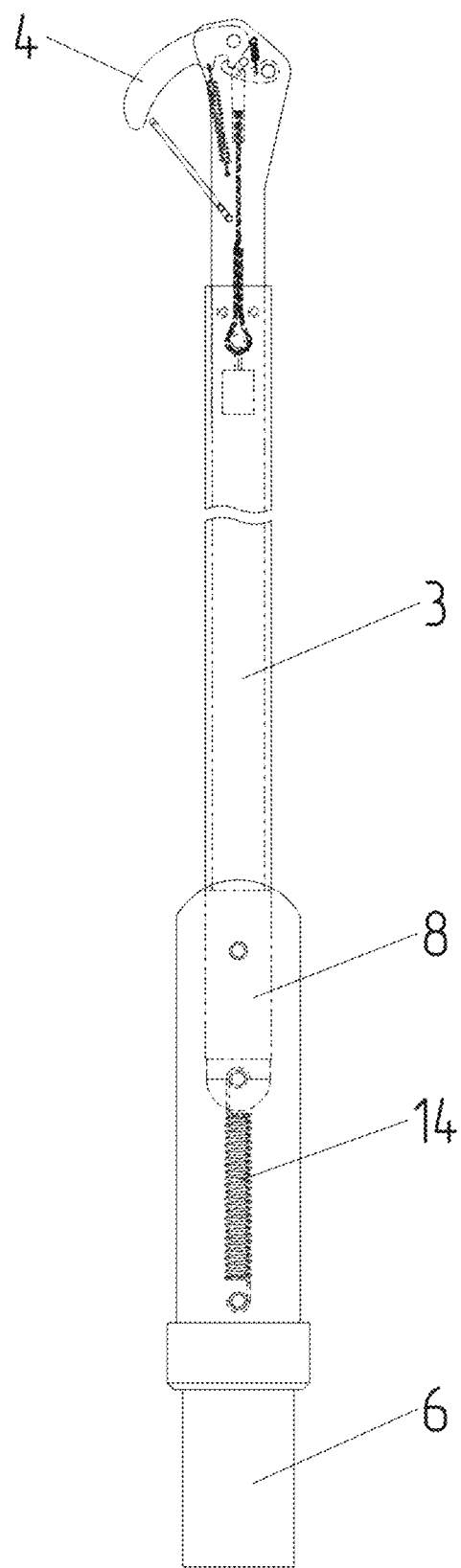
FIG. 12 is the engagement/disengagement device with the interaction means of the UAV in the form of the hook in a closed state.
Figure 13:
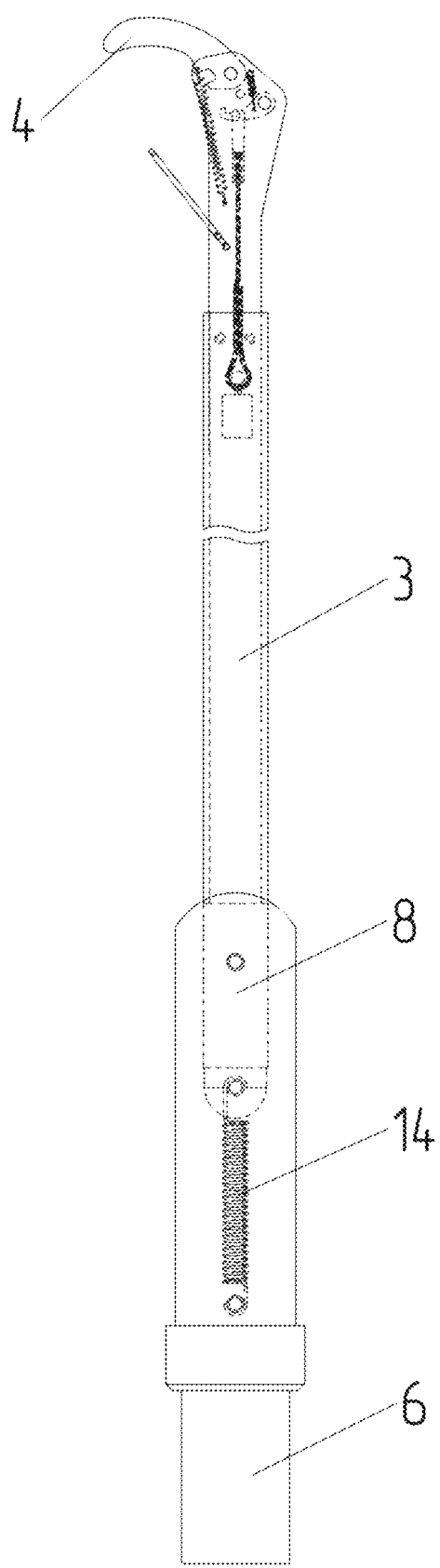
FIG. 13 is the engagement/disengagement device with the interaction means of the UAV in the form of the hook in an opened state.

One of the preferable exemplary embodiments of the device for launching and catching of the remotely guided UAV is illustrated in FIG. 1, FIG. 2, FIG. 17 and FIG. 18, according to which, the supporting post 1 is made as a pyramid-like structure, e.g., of metal wired profiles. The shaft 7 with two bearing assemblies is arranged in the upper portion of the post 1. The lever 2 is fixed on the shaft 7 with a possibility of rotation thereof around the horizontal axis within the vertical plane. The means for accumulating and/or dissipating the energy is arranged on the shaft, the means being the counterweight 10 with the brakes 11, which are diametrically opposite to fixation location of the lever, or being the servomotor 12. The lever 2 consists of the bar and the engagement/disengagement device, which are connected by means of the hinge between each other. Therewith, as the hinge 8, the hinge with the counterspring that is made either cylindrical 14 as illustrated in FIG. 12 and FIG. 13, or spiral spring 15 as illustrated in FIG. 8 and FIG. 9, or as the hinge having an elastic rope 16 as illustrated in FIG. 6 and FIG. 7, or as the hinge having the cylindrical spring 18 and the cam fixing device 17 as illustrated in FIG. 10 and FIG. 11, may be used. The engagement/disengagement device 3 is equipped with the hook 4 that may be in the locked state as illustrated in FIG. 12 or in the unlocked state as in FIG. 13, with an electromagnet being used to change the state thereof, and the spring being used as the elastic member of the hinge.

In a ready-to-catch state, the device is in the state, wherein the lever is located higher than the shaft oriented vertically or with an insignificant offset from the vertical towards the movement direction of the UAV or against the movement direction of the UAV. The guided UAV that is equipped with the guidance system fixes a position of the optical member 20 on the lever 2 and corrects a course through its own guidance system in such a way that the working portion of the frame is caught by the hook of the device. Quite often, the contact between the frame and the hook occurs not only in the catching point of the frame, but in another point of the elastic portion of the frame. After such contact, the hook slides along the frame and transfers to the catching point that is preferably located in the middle of the working portion of the frame, and the lever elastically deforms in the location of the elastic insert 13 and transfers the hook within the plane that is perpendicular to the rotation plane to the catching point on the frame. Such elastic transfer of the lever enables to significantly increase side impulse loads acting on the lever with the caught UAV and, as a consequence, to reduce the level of oscillations of the device with the caught UAV.

From the moment the UAV is caught, the lever rotates from the upper position relative to the shaft towards the lower one. A set of forces acts on the device being a shock at the moment of catching, forces resulting from the elastic deformation of the insert 13, centrifugal forces of the UAV that moves in a curved manner, wind loads etc. Under the action of the set of forces, the engagement/disengagement device, through the hinge 8, rotates around the bar within the rotation plane of the lever as illustrated in FIG. 6, FIG. 7 or in FIG. 10, FIG. 11, the UAV moves according to the trajectory that differs from the circular one until the stoppage in the lower point, and the counterweight lifts from the position that is lower relative to the shaft to the upper one with the simultaneous braking by means of one of types of brakes, which are known from the prior art, e.g., disc-type brakes 11, as illustrated for the mentioned embodiment. After the lever is pivoted to the vertical down position, the bar stops, and the engagement/disengagement device that is coupled to the bar by means of the hinge continues to move and may perform several oscillations relative to the axis of the bar within the rotation plane of the lever until the full stoppage.

A second embodiment of the device for launching and catching of the remotely guided UAV is illustrated in FIG. 3, FIG. 4, FIG. 5, FIG. 14, FIG. 15 and FIG. 16. The supporting post 1 is made as a vertical support having an arbitrary profile and arranged on the platform that may be made rotatable. The shaft 7 is mounted in the upper portion of the supporting post 1 as a cantilever that is coupled, with one end, to the servomotor 12, while the lever is fixed on the second end of the shaft. The shaft 7 is mounted on bearings and it may be protected with a casing.

The servomotor holds the lever vertically or with an insignificant offset from the vertical towards the movement direction of the UAV or against the movement direction of the UAV. At the moment of catching the UAV, the lever begins to rotate from the upper position relative to the shaft towards the lower position. A set of forces acts on the device being a shock at the moment of catching, forces resulting from the elastic deformation of the insert 13, centrifugal forces of the UAV that moves in a curved manner, wind loads, the rotary moment that is created by the servomotor. Under the action of the set of forces, the engagement/ disengagement device, through the hinge 8, rotates around the bar within the rotation plane of the lever as illustrated in FIG. 6, FIG. 7, FIG. 10 and FIG. 11. From the moment of start of the lever movement, the servomotor transits to the recuperation mode and performs gradual braking of the lever until the full stoppage of the bar. After the lever is pivoted to the vertical down position, the bar stops in the lower vertical position, and the engagement/disengagement device that is coupled to the bar by means of the hinge continues to move within the rotation plane of the lever and may perform several oscillations relative to the axis of the bar within the rotation plane of the lever until the full stoppage.

The possibility of launching the UAV by means of the claimed device is illustrated in FIG. 14, FIG. 15 and FIG. 16, for which, a take-off direction of the UAV is determined, wherein the interactions means for the device and the UAV, which is arranged on the engagement/disengagement device, are in the locked state, while the lever itself is located in the lower vertical position relative to the horizontal rotation axis, and the supporting post is rotated around the vertical axis until the rotation plane of the bar coincides with the vertical plane of the UAV take-off direction. In order to start launching, the UAV motor is switched on, then, by means of a traction force of the UAV motor and due to the force acting from the means for accumulating and dissipating the kinetic energy that results from use of the energy accumulated within the period of catching the UAV, the lever begins to move from the lower vertical position towards the position higher than the horizontal one. After the bar of the lever is rotated for an angle of more than 90 degrees from its lower vertical position and the UAV weight is counterbalanced by the lifting force, the interaction means of the device and the UAV are unlocked followed by their disengagement. After the launch has been performed, the lever is set to the vertical position higher than the shaft and the device is ready for yet another catching step.

The possibility of implementation of the purpose of the device will not cause difficulties for persons skilled in the art and will enable to use the claimed device to perform operations of catching and launching the UAV. Therefore, the claimed invention provides creation of the device that is characterized by functions of reliability and safety, may be mounted on a relatively small area and may be easy in maintenance and use.

The invention claimed is:

1. A device for catching and launching a guided unmanned aerial vehicle (UAV), the device comprising:
    a supporting post (1) with a horizontal shaft (7) mounted in an upper portion of the supporting post, and
    a lever (2) mounted on the horizontal shaft (7) so as to make a full revolution around a horizontal axis of the horizontal shaft (7) within a vertical plane,
    the lever comprising an engagement/disengagement member (3) that is equipped with an interaction means (4) for an interaction with a UAV (19) catching member (5) and an active or a passive optical member (20), which is arranged on the lever (2),
    wherein the lever (2) further comprises two coaxial portions, one of which is the engagement/disengagement member (3), and the other is a bar (6), with one end of the bar coupled to the horizontal shaft (7), while another end of the bar is connected to the engagement/ disengagement member (3),
    wherein the two coaxial portions are connected to each other by means of a hinge (8) so that the two coaxial portions are fixed in a coaxial state and of offsetting an axis of the engagement/disengagement member (3) relative to an axis of the bar (6) axis within a rotation plane of the lever (2),
    wherein the horizontal shaft (7) is equipped with a means (10, 11, 12) for accumulating and/or dissipating kinetic energy of the UAV (19),
    wherein the lever (2) is fixed on the horizontal shaft (7) so as to provide an elastic offset of the interaction means (4) of the engagement/disengagement member (3) within a plane that is perpendicular to the rotation plane of the lever (2), and
    wherein the interaction means (4) is configured to provide a mutual locking/unlocking with a catching member (5) of the UAV.

2. The device for catching and launching a guided unmanned aerial vehicle (UAV) according to claim 1, wherein the hinge (8) provides the offset of the axis of the engagement/disengagement member (3) relative to the axis of the bar (6) by an angle in a range between 0° and 90°.

3. The device for catching and launching a guided unmanned aerial vehicle (UAV) according to claim 1, further comprising a mechanical system for accumulating and/or dissipating the kinetic energy, the mechanical system comprising a counterweight (10) that is fixed on the horizontal shaft (7) and has a mechanical and/or electromechanical brake (11).

4. The device for catching and launching a guided unmanned aerial vehicle (UAV) according to claim 1, wherein the means for accumulating and/or dissipating the kinetic energy is an electromechanical system having a servomotor (12).

5. The device for catching and launching a guided unmanned aerial vehicle (UAV) according to claim 1, wherein the elastic offset of the interaction means (4) of the engagement/disengagement member (3) within the plane that is perpendicular to the rotation plane of the lever (2) is provided by making the bar (6) with a planar elastic section (13).

6. The device for catching and launching a guided unmanned aerial vehicle (UAV) according to claim 1, wherein the mutual locking/unlocking of the interaction means (4) for interaction with the catching member (5) is provided by a mechanical or electromechanical means that is mounted in the engagement/disengagement member (3).

7. The device for catching and launching a guided unmanned aerial vehicle (UAV) according to claim 1, wherein the supporting post (1) is a structure with two supports having the horizontal shaft (7) arranged between the supports.

8. The device for catching and launching a guided unmanned aerial vehicle (UAV) according to claim 1, wherein the engagement/disengagement member (3) is configured to have a length that is smaller or equal to a length of the bar (6).

9. The device for catching and launching a guided unmanned aerial vehicle (UAV) according to claim 1, wherein the interaction means (4) is made as a hook, and the catching member (5) is made as an elastic frame.

10. The device for catching and launching a guided unmanned aerial vehicle (UAV) according to claim 1, wherein the interaction means (4) is made as an elastic frame, and the catching member (5) is made as a hook.

* * * * *